United States Patent [19]

Reiter

[11] Patent Number: 5,263,668
[45] Date of Patent: Nov. 23, 1993

[54] COMPUTER PEDESTAL

[75] Inventor: Victor R. Reiter, Huntington Beach, Calif.

[73] Assignee: AST Research, Inc., Irvine, Calif.

[21] Appl. No.: 777,689

[22] Filed: Oct. 15, 1991

[51] Int. Cl.⁵ .............................................. A47B 91/00
[52] U.S. Cl. .................................... 248/346; 248/678; 248/917
[58] Field of Search ...................... 248/346, 917, 678; 108/51.1, 64, 65

[56] References Cited

U.S. PATENT DOCUMENTS

| | | | |
|---|---|---|---|
| 3,650,224 | 3/1972 | Petix et al. | 108/51.1 |
| 3,962,660 | 6/1976 | Duckett | 248/346 X |
| 4,324,190 | 4/1982 | Hewitt | 108/51.1 |
| 4,635,811 | 1/1987 | Codi | 108/51.1 X |
| 4,724,968 | 2/1988 | Wombacher | 211/43 |
| 4,922,832 | 5/1990 | Kraus | 108/51.1 |
| 4,993,330 | 2/1991 | Yen | 108/51.1 X |
| 5,020,768 | 6/1991 | Hardt et al. | 248/917 X |
| 5,105,746 | 4/1992 | Reynolds | 108/51.1 X |

FOREIGN PATENT DOCUMENTS 93927 3/1959 Denmark ..................... 248/346.1

Primary Examiner—Alvin C. Chin-Shue
Attorney, Agent, or Firm—Knobbe, Martens, Olson & Bear

[57] ABSTRACT

A computer pedestal for stably supporting a computer component in an upright orientation can be nestably engaged with other like pedestals to permit side-by-side stowage of a plurality of computer components. The pedestal has a flat parallelepiped-shaped base, and at least one stabilizer extends outwardly from the base to provide lateral support to the base. Also, a channel is formed in the base opposite the stabilizer. The stabilizer is configured to closely conform to the channel, so that the stabilizer can nestably mate with the channel of another like pedestal when the two pedestals are positioned side-by-side. The components that are supported by the nested pedestals can accordingly be closely and stably disposed side-by-side.

22 Claims, 4 Drawing Sheets

COMPUTER PEDESTAL

The present invention relates generally to computer accessories, and more particularly, to computer pedestals. The present invention particularly, though not exclusively, relates to computer pedestals for nesting a plurality of computer components in a side-by-side configuration.

BACKGROUND OF THE INVENTION

Advances in computer technology have made relatively small yet computationally powerful computers widely available to a broad range of users. The ubiquitous personal computer, such as the personal computers manufactured and marketed by the assignee of the present invention, is perhaps the most familiar example of modern computer technology.

To augment their computing power, these small computers ordinarily can be networked to other personal computers, or to other kinds of computer components, e.g., external hard drives. Not surprisingly, it is typically convenient to stow various components of a single personal computer system, including hard drives and computers, in a common location.

Fortunately, because of their relatively compact size, personal computers (and their associated components) can be conveniently stowed in a variety of locations in a home or office. Many personal computers and their associated components are shaped as parallelepipeds with generally broad, square bottom and top surfaces and generally narrow, rectangularly-shaped front, back, and side surfaces. For stability, the computers and components are often stowed resting on their relatively broad bottom surfaces. Several components may even be stacked one on top of the other in this manner.

Despite the relatively small size of modern computers and their components, space constraints may nevertheless dictate that the computer and components cannot be stowed resting on their relatively broad bottom surfaces. Instead, the space available may require that the computer components be stowed with the components resting on their relatively narrow side surfaces.

Understandably, given the typical shape described above for personal computers and their components, such apparatus are somewhat laterally unstable when stowed resting on their relatively narrow side surfaces, and tend to tip over relatively easily, upon the application of only minimal force. The lateral instability of the computers and components increases when the computers and components rest upon non-rigid surfaces, e.g., padded carpeting.

Accordingly, it is desirable to provide a means by which a computer or computer component that is shaped like a parallelepiped can be stably stowed resting on one of its relatively narrow side surfaces.

Further, for the reasons discussed above, the means for stowing the computer components on their narrow side surfaces should provide lateral stability to the components. Also, because it may be desirable to stow several individual components together in a side-by-side manner, the stowing means should permit several such components to be stowed closely together. The several side-by-side components, resting on their narrow side surfaces, can thereby optimize the use of available space.

Accordingly, it is an object of the present invention to provide a computer pedestal for stably supporting a parallelepiped-shaped computer component on a side surface of the component. It is a further object of the present invention to provide a computer pedestal for stably supporting a parallelepiped-shaped computer component on its side surface, and to permit a plurality of individual like components to be similarly stowed, side-by-side. Yet another object of the present invention to provide a computer pedestal for stably supporting a parallelepiped-shaped computer component that is easy to use and cost-effective to manufacture.

SUMMARY OF THE INVENTION

A computer pedestal is provided for stably supporting a computer component in a substantially upright orientation while the component is resting on one of its relatively narrow surfaces. The pedestal can be nestably engaged with other like pedestals so that a plurality of individual computer components can be positioned side by side.

In a preferred embodiment, the pedestal has a substantially flat base with first and second opposing side edges. A first channel extends laterally inwardly on the base from the first side edge and second and third channels extend laterally inwardly on the base from the second side edge. A first stabilizer segment extends laterally outwardly from the second side edge, with the axis of the stabilizer segment disposed between the second and third channels. This first stabilizer segment is configured to mate with the first channel of another like pedestal.

Second and third stabilizer segments extend laterally outwardly from the first side edge with the axis of the first channel extending between the second and third stabilizer segments. In accordance with the present invention, the second and third stabilizer segments are configured for mating engagement with second and third channels of an adjacent like pedestal.

In a preferred embodiment, the base is shaped substantially as a parallelepiped and the stabilizer segments provide lateral support to the base. If desired, the base can include one or more fasteners for engaging a computer component and holding the computer component against the base.

As envisioned by the present invention, the base has first and second surfaces. The two surfaces are separated from each other by the side edges, and the channels are formed in the first surface with the fasteners being operably engaged with the second surface.

In another aspect of the present invention, first and second substantially identical computer pedestals are nestably engageable with each other. Each pedestal has a base, and each base has a plurality of stabilizers that extend outwardly from the base. Further, each base is formed with a plurality of channels, with each channel being formed opposite a respective stabilizer. At least one stabilizer of the first pedestal is configured for mating engagement with a corresponding channel in the second pedestal.

In yet another aspect of the present invention, a computer pedestal is provided that includes a flat base having a channel formed on the base. A stabilizer is also formed on the base opposite the channel, and the stabilizer extends outwardly from the base. The stabilizer is configured to laterally support the base when a computer component is supported on the base. The stabilizer of the base is configured for mating engagement with the channel on another like pedestal.

The details of the operation and construction of the present invention can be best understood in reference to the accompanying drawings, in which like figures refer to like parts, and in which:

DETAILED DESCRIPTION OF THE PREFERRED EMBODIMENT

Figure 1:
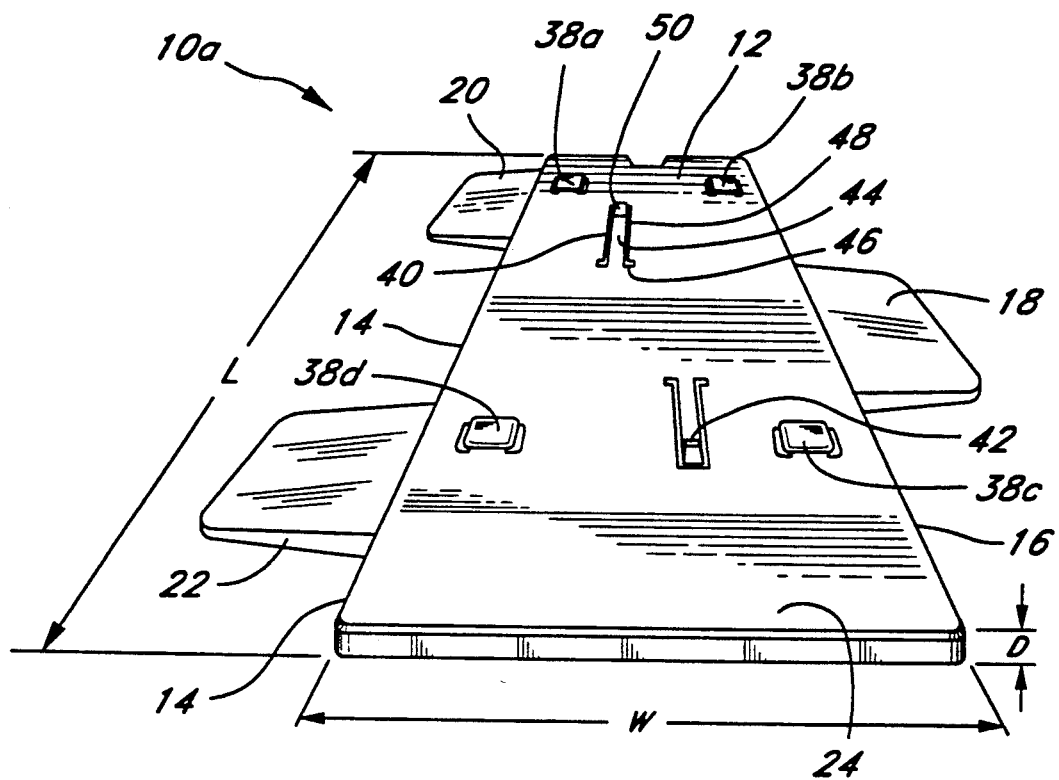
FIG. 1 is a top perspective view of a computer pedestal of present invention.
Figure 2:
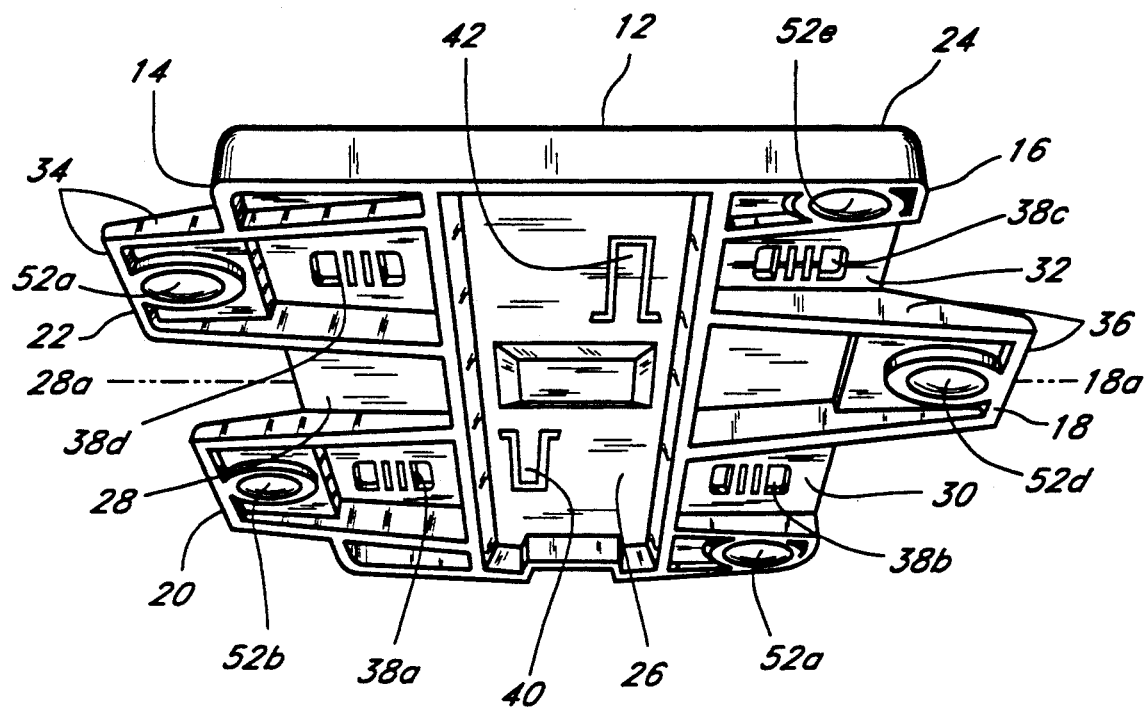
FIG. 2 is a bottom perspective view of a computer pedestal of the present invention.

Referring initially to FIGS. 1 and 2, a computer pedestal is generally designated by Reference Numeral 10a. As will be further disclosed below, the computer pedestal 10a can stably support a computer or computer component (not shown in FIGS. 1 and 2) in an upright position. Specifically, the pedestal 10a of the present invention, when used as herein described, is designed to meet the computer component stability standards set forth in Information Technology Equipment—UL 1950, dated Mar. 15, 1989 and published by Global Engineering Documents. As also disclosed below in greater detail, the pedestal 10a can be nestably engaged with other like pedestals, such that the computer components that are supported on the respective pedestals can be stowed in a side-to-side relationship. In accordance with the present invention, the pedestal 10a is made of a rigid, strong, yet lightweight material, e.g., a hard plastic such as ABS or a lightweight metal, such as aluminum.

FIGS. 1 and 2 show one presently preferred embodiment of the present invention, wherein the computer pedestal 10a is intended to support an object having the approximate size and weight of a personal computer, such as the AST Research Inc., Model Premium SE4/33 personal computer. As shown in FIGS. 1 and 2, the computer pedestal 10a has a base 12 that is shaped substantially as a parallelepiped. FIG. 1 shows that the base 12 has a length 1, and the length 1 in one presently preferred embodiment is about eighteen and one-half inches (18.5"). Also, the base 12 has a width w of about eight and three-quarters inches (8.75"), and a depth d of about seven-eighths of an inch (0.88"). The dimensions of the base 12 are established as appropriate for the particular component to be supported by the pedestal 10a.

FIGS. 1 and 2 show that the base 12 has a first longitudinal side edge 14 and a second longitudinal side edge 16 opposite to and parallel with the first side edge 14. A first outwardly protruding stabilizer 18 may be attached to or formed integrally with the base 12, and extends laterally outwardly from the second side edge 16. Also, second and third outwardly protruding stabilizers 20, 22, may be attached to or formed integrally with the base 12, and extend laterally outwardly from the first side edge 14.

FIG. 2 shows that the base 12 has a first (i.e., top) surface 24 and a second (i.e., bottom) surface 26 that is opposite from the first or top surface 24. As shown, a first lateral channel 28 is formed on the bottom surface 26 of the base 12 and second and third lateral channels 30, 32 are also formed on the bottom surface 26 of the base 12. As shown, the first channel 28 is formed on the base 12 substantially opposite from the first stabilizer 18. Also, the second channel 30 is formed on the base 12 substantially opposite from the second stabilizer 20, and the third channel 32 is formed on the base 12 substantially opposite from the third stabilizer 22. Stated differently, the first channel 28 is formed on the base 12 such that an axis 28a of the channel 28 is substantially intermediate to the second and third stabilizers 20, 22. Further, the first stabilizer 18 is formed on the base 12 such that an axis 18a of the first stabilizer 18 is substantially intermediate the second and third channels 30 and 32.

Still referring to FIG. 2, it can be appreciated that the stabilizers 18, 20, 22 and channels 28, 30, 32 of the base 12 are established by generally longitudinal side walls of the base 12. More particularly, FIG. 2 shows that the base 12 has a first side wall 34 and a second side wall 36. As shown, the side wall 34 is formed to establish the stabilizers 20, 22 and the channel 28. Similarly, the side wall 36 is formed to establish the stabilizer 18 and the channels 30, 32.

FIG. 1 shows that the computer pedestal 10a has four computer pads 38a, 38b, 38c, 38d, and two computer latches 40, 42. As shown in FIG. 1, the computer pads 38a, 38b, 38c, 38d are attached to or formed integrally with the top surface 24 of the base 12. In accordance with the disclosure below, a computer component (not shown in FIG. 1) can rest on the computer pads 38a–d.

FIG. 1 also shows that the computer latch 40 includes a tongue 44 that is connected to or formed integrally with the base 12 at a fixed one of its ends 46. A free end 48 of the tongue 44 is located opposite the fixed end 46, and is selectively movable up and down with respect to the base 12. The tongue 44 is biased in the position shown in FIG. 1, i.e., substantially co-planar with respect to the base 12. The tongue 44 is also provided with a downwardly-projecting abutment 50. The tongue 44 with the abutment 50 can selectively engage a complementary structure on a computer component that is to be supported on the pedestal 10a by means well known in the art, and thereby retain the component on the computer pads 38a–d of the base 12.

The computer latch 42 is in all essential respects identical to the computer latch 40. Preferably, the latches 40 and 42 are formed integrally at their respective fixed ends with the base 12. Also, the computer pads 38a, 38b, 38c, 38d may be formed integrally with the base 12 or may be attached to the base 12 by suitable means such as solvent bonding or sonic welding.

FIG. 2 also shows that the computer pedestal 10a can include support structures for resting against the surface on which the computer pedestal 10a is placed. In the embodiment shown in FIG. 2, the computer pedestal 10a includes a plurality of bottom pads 52a, 52b, 52c, 52d, 52e. As shown in FIG. 2, the bottom pads 52a, 52b, 52c, 52d, 52e are circular in shape and extend downwardly from the bottom surface 26 of the base 12 of the computer pedestal 10a. Preferably, the bottom pads 52a, 52b, 52c, 52d, 52e are formed integrally with the base 12. If desired, the bottom pads 52a, 52b, 52c, 52d, 52e may be covered with a felt-like material (not shown) for minimizing damage to the surface on which the computer pedestal 10a is to rest. Alternatively, the bottom pads 52a–e can have a comparatively rough material deposited thereon to reduce sliding of the pads 52a–e when the pedestal 10a is placed on a slippery surface, e.g., floor tile. It is to be understood that greater or fewer computer pads 38 may be provided on the pedestal 10a and greater or fewer computer latches 40, 42 and bottom pads 52 may also be provided.

As shown in FIG. 2, the stabilizers 18, 20, 22 are tapered and the channels 28, 30, 32 are likewise tapered. Accordingly, the stabilizers 18, 20, 22 are configured for mating engagement with the complementarily-shaped channels of a second pedestal, which is to be nestably engaged with the pedestal 10a.

Figure 3:
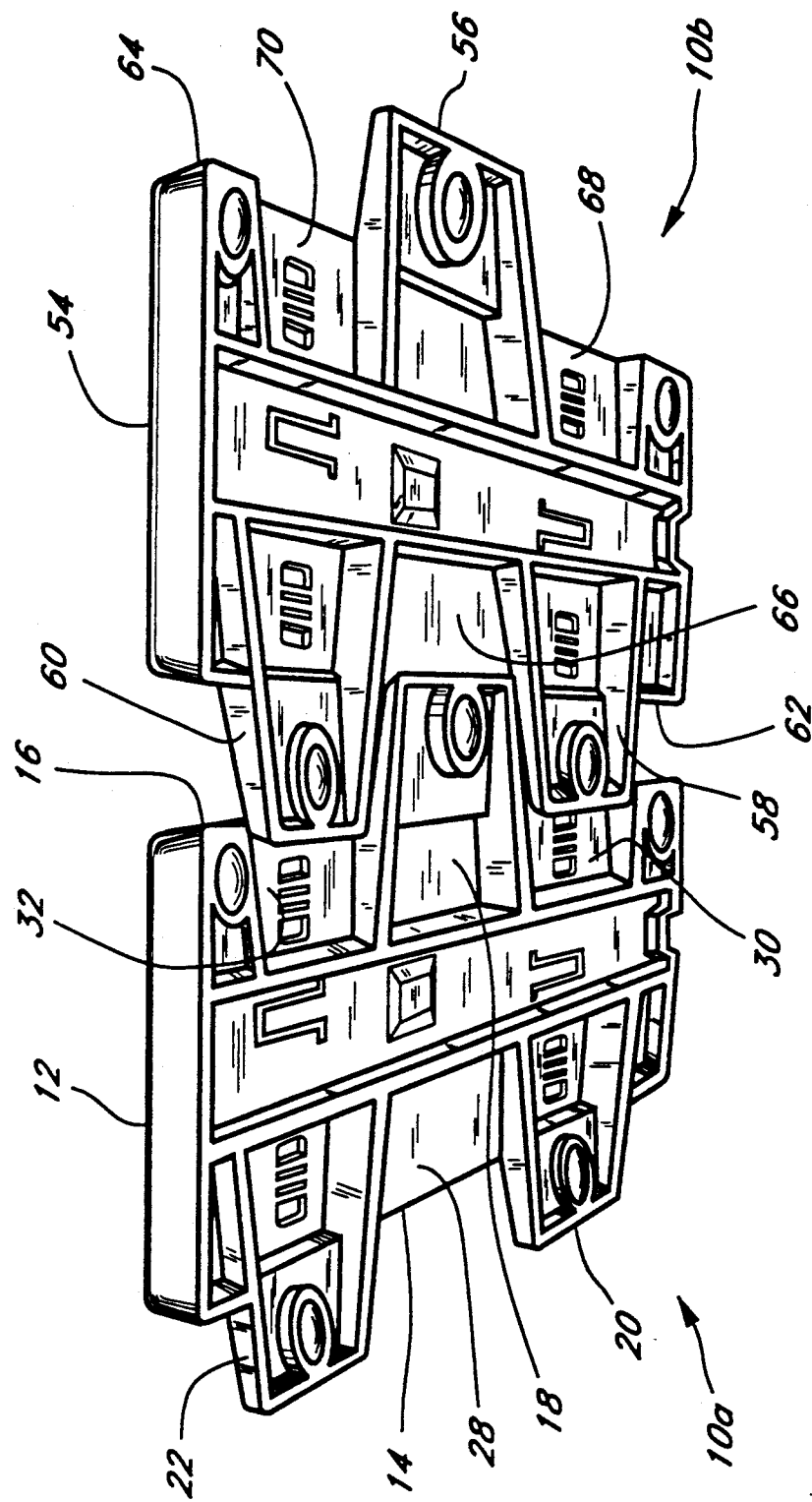
FIG. 3 is a bottom perspective view of two like pedestals of the present invention, with the pedestals separated from one another.
Figure 4:
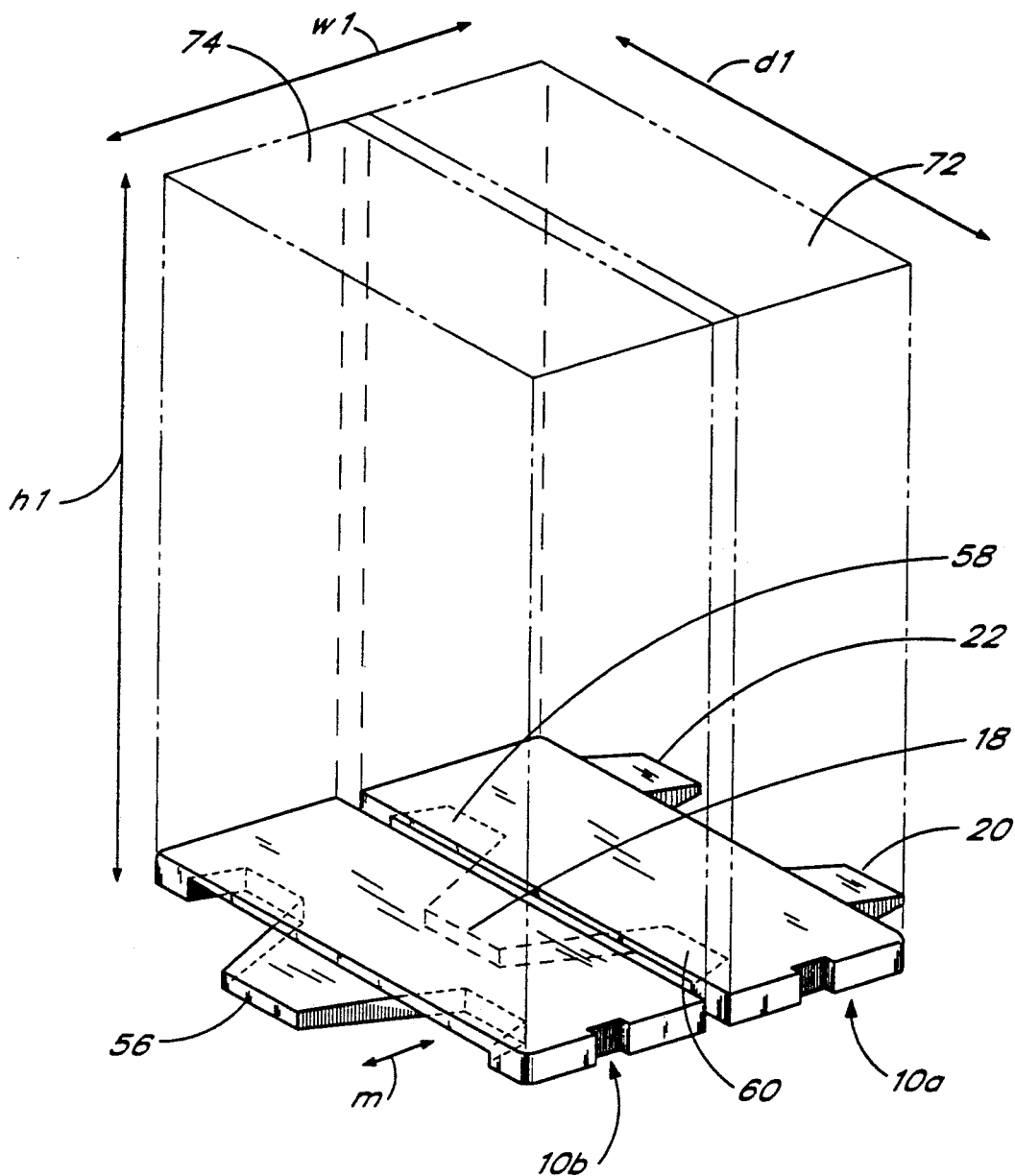
FIG. 4 is a front perspective view of two computer components mounted side by side on two like pedestals of the present invention, with portions shown in phantom for clarity.

For example, referring now to FIGS. 3 and 4, the first pedestal 10a can be nestably engaged with a second like pedestal 10b. As shown best in FIG. 3, the second computer pedestal 10b, which is in all essential respects identical in construction to the first computer pedestal 10a, has a base 54, a first outwardly protruding stabilizer 56, second and third outwardly protruding stabilizers 58 and 60, first and second opposite longitudinal side edges 62 and 64, and first, second, and third channels 66, 68, and 70.

As indicated in FIG. 3, the second and third stabilizers 58 and 60 of the second computer pedestal 10b can be engaged with cooperatively-receiving structure of the first computer pedestal 10a. More specifically, the second and third stabilizers 58, 60 of the second pedestal 10b can be slid into the second and third channels 30, 32 of the first pedestal 10a to matingly engage the second and third channels 30, 32. As can be appreciated in reference to FIG. 3 and the disclosure above, when the pedestals 10a, 10b are positioned together with the stabilizers 58, 60 of the second pedestal 10b matingly engaged with the channels 30, 32 of the first pedestal 10a, the stabilizers 58, 60 are closely received in and closely conform to the channels 30, 32.

Likewise, the first stabilizer 18 of the first computer pedestal 10a can be engaged with cooperatively-receiving structure on the second computer pedestal 10b. More specifically, the first stabilizer 18 of the first pedestal 10a can mate with the first channel 66 of the second pedestal 10b.

Accordingly, the pedestals 10a and 10b can be placed side by side with the second edge 16 of the first pedestal 10a parallel to and juxtaposed with the first edge 62 of the second pedestal 10b. Such a positioning is shown in FIG. 4, which shows that a pair of computer components 72, 74 (shown in phantom) can be mounted on the pedestals 10a, 10b. More specifically, the components 72, 74 can rest on the component pads (e.g., pads 38a-d of the first pedestal 10a) of their respective pedestals, and are held onto their respective pedestals by the cooperation of structure between the computer latches (e.g., latches 40, 42 of the first pedestal 10a) and complementary structure on the components 72, 74.

The cooperation of structure between the stabilizers of one pedestal and the channels of the other pedestal permits the computer pedestals 10a and 10b to be placed together in a closely fitting, side-by-side relationship, as shown in FIG. 4, while also providing lateral support to the components that are supported on the pedestals 10a, 10b. When it is desired to separate the pedestals 10a and 10b, the pedestals 10a and 10b are simply slid apart relative to one another.

Still referring to FIG. 4, the second and third stabilizers 20 and 22 of the first pedestal 10a and the first stabilizer 56 of the second pedestal 10b extend laterally outwardly from their respective pedestals and also extend laterally outwardly from underneath the respective computer components 72 and 74 to which they are mounted. The distance "m" by which each of the stabilizers 20, 22, 56 extend outwardly from their respective computer components 72, 74 is selected in order to provide lateral support and stability to the computer components 72, 74 when the pedestals 10a, 10b are nestably engaged. It will be appreciated by the skilled artisan that the distance m will be established by appropriate industry standards (e.g., the above-referenced, Information Technology Equipment-UL 1950) regarding lateral support for computer components which are oriented as shown in FIG. 4. In one presently preferred embodiment, the distance m is equal to about two and one-half inches (2.5"). Accordingly, as shown, the pedestals 10a, 10b permit stable side-by-side positioning of the components 72, 74.

Furthermore, FIG. 4 shows that the computer components 72, 74 each have a height h1, width w1 and a depth d1, and that the computer pedestals 10a, 10b permit placing the computer components 72, 74 side-by-side in an upright orientation relative to the ground plane, i.e., with the dimension of the computer components 72, 74 represented by their height h1 perpendicular to the surface on which the computer pedestals rest. In other words, the computer components 72, 74 can be stably stowed side-by-side, resting on one of their relatively narrow side surfaces.

FIG. 4 also shows that the computer components 72, 74 slightly overlap the computer pedestals 10a, 10b near the edges of the pedestals 10a, 10b. It may now be appreciated that the length 1 and width w of the pedestal 10a are established to closely approximate the depth d1 and width w1 of the component 72.

While FIG. 4 shows two pedestals 10a, 10b that are nestably engaged, it is to be understood that more than two pedestals can be nestably engaged to permit the adjacent, side-by-side stowage of several computer components, in accordance with the above-stated principles. The above disclosure describes but one embodiment of the present invention. It is to be understood that other embodiments are also contemplated and are within the spirit and scope of the present invention, and that the scope of the present invention is accordingly to be limited by nothing other than the appended claims.

What is claimed is:

1. A computer pedestal, comprising:
   a substantially flat base having first and second opposing side edges;
   a first channel extending in a first inward direction towards a longitudinal axis of said base from said first side edge, said channel tapering in said first inward direction;
   second and third channels extending in a second inward direction, opposite said first inward direction, into said base from said second side edge, said second and third channels tapering in said second inward direction;
   a first permanently positioned stabilizer segment extending from said second opposing side edge in a first outward direction away from said longitudinal axis, said first stabilizer segment being tapered in said first outward direction for mating with a first inwardly tapered channel of another like computer pedestal; and
   second and third permanently positioned stabilizer segments extending outwardly from said first side edge, said second and third stabilizer segments being tapered in a second outward direction opposite said first outward direction for mating engagement with a pair of respective second and third inwardly tapered channels of another like pedestal.

2. A pedestal according to claim 1, wherein said first stabilizer segment is intermediate said second and third channels.

3. A pedestal according to claim 1, wherein said first channel is intermediate said second and third stabilizer segments.

4. A pedestal according to claim 1, wherein said base is substantially a parallelepiped.

5. A pedestal according to claim 1, wherein said stabilizer segments are configured to provide lateral support to said base.

6. A pedestal according to claim 1, wherein said base includes at least one latch for engaging a computer and holding said computer against said base.

7. A pedestal according to claim 6, wherein said base has first and second surfaces, said surfaces being separated from each other by said side edges, said channels being formed in said first surface and said latch being operably engaged with said second surface.

8. A pedestal according to claim 1, wherein said stabilizer segments are formed integrally with said base.

9. A pedestal according to claim 1, wherein said stabilizer segments are attached to said base.

10. A computer pedestal system for providing lateral stability for a plurality of stored computer components, said system comprising:
a first computer pedestal, comprising:
a base having a top surface, a first side edge and an opposing second side edge, said base defining a first channel extending inwardly on said base from said first side edge and second and third channels extending inwardly on said base from said second side edge, said top surface of said base covering said channels; and
a first permanently positioned stabilizer segment extending outwardly from said second side edge of said base and second and third permanently positioned stabilizer segments extending outwardly from said first side edge, each stabilizer segment being positioned opposite a channel, said stabilizer segments tapering in width and in thickness in an outward direction away from a longitudinal axis of said base, and said channels correspondingly tapering in an inward direction towards said longitudinal axis; and
a second computer pedestal, comprising:
a base having a top surface, a first side edge and an opposing second side edge, said base defining a first channel extending inwardly on said base from said first side edge and second and third channels extending inwardly on said base from said second side edge, said top surface of said base covering said channels; and
a first permanently positioned stabilizer segment extending outwardly from said second side edge of said base and second and third permanently positioned stabilizer segments extending outwardly from said first side edge, each stabilizer segment being positioned opposite a channel, at least one of said stabilizer segments of said second pedestal being tapered in on outward direction to matingly engage a corresponding inwardly tapered channel of said first pedestal such that said top surface covering said inwardly tapered channel of said first pedestal overlaps said stabilizer of said second pedestal to provide lateral support to the components supported by said second pedestal.

11. A pedestal according to claim 10, wherein said first stabilizer segment is intermediate said second and third channels, and said first channel is intermediate said second and third stabilizers segments.

12. A pedestal according to claim 10, wherein said base is substantially shaped like a parallelepiped.

13. A pedestal according to claim 10, wherein said stabilizer segments are configured to provide lateral support to said base.

14. A pedestal according to claim 10, wherein said base includes at least one latch for engaging a computer and holding said computer against said base.

15. A pedestal according to claim 14, wherein said base has first and second surfaces, said surfaces being separated from each other by said side edges, said channels being formed in said first surface and said latch being operably engaged with said second surface.

16. A pedestal for supporting a computer, comprising:
a flat base having a top surface covering an inwardly tapered channel extending inwardly from a first edge; and
an outwardly tapered permanently positioned stabilizer connected to a second edge of said base opposite said channel and extending outwardly therefrom to laterally support said base, said outwardly tapered permanently positioned stabilizer being configured for mating engagement with an inwardly tapered channel of an adjacent pedestal to provide lateral support to the components supported by the pedestals.

17. A pedestal for supporting a computer, comprising:
a flat base having a first inwardly tapered channel extending inwardly from a first side edge;
second and third inwardly tapered channels extending inwardly from said second side edge;
a first outwardly tapered permanently positioned stabilizer connected to a second edge of said base opposite said first channel and extending outwardly from said second side edge to laterally support the base, said outwardly tapered permanently positioned first stabilizer being configured for mating with a first channel of another said pedestal; and
second and third outwardly tapered permanently positioned stabilizers extending outwardly from said first edge, said second and third outwardly tapered permanently positioned stabilizers being configured for mating engagement with respective second and third channels of another said pedestal.

18. A pedestal according to claim 17, wherein said first stabilizer is intermediate said second and third channels, and said first channel is intermediate said second and third stabilizers.

19. A pedestal according to claim 18, wherein said base is substantially a parallelepiped.

20. A pedestal according to claim 19, wherein said stabilizer segments are configured to provide lateral support to said base.

21. A pedestal according to claim 19, wherein said base includes at least one latch for engaging a computer and holding said computer against said base.

22. A computer pedestal system for providing lateral stability for a plurality of stored computer components, said system comprising:

a first computer pedestal, comprising:

a base having a top surface and a plurality of permanently positioned stabilizers extending outwardly from said base, said base defining a plurality of channels covered by said top surface, each channel being positioned opposite a stabilizer, said stabilizers tapering in width and in thickness in an outward direction away from a longitudinal axis of said base, and said channels correspondingly tapering in an inward direction towards said longitudinal axis; and a second computer pedestal, comprising:

a base having a top surface and a plurality of permanently positioned stabilizers extending outwardly from said base, said base defining a plurality of channels covered by said top surface, each channel being positioned opposite a stabilizer, at least one of said stabilizers of said second pedestal being tapered in an outward direction to matingly engage a corresponding inwardly tapered channel of said first pedestal such that said top surface covering said inwardly tapered channel of said first pedestal overlaps said stabilizer of said second pedestal to provide lateral support to the components supported by said second pedestal.

* * * * *